United States Patent
Seebauer et al.

(10) Patent No.: US 12,030,153 B2
(45) Date of Patent: Jul. 9, 2024

(54) MAGNETIC BASE

(71) Applicant: C. & E. Fein GmbH, Schwaebisch Gmuend-Bargau (DE)

(72) Inventors: Ralf Seebauer, Oberdachstetten (DE); Ralf Gosnik, Eislingen (DE)

(73) Assignee: C. & E. FEIN GMBH, Schwaebisch Gmuend-Bargau (DE)

( * ) Notice: Subject to any disclaimer, the term of this patent is extended or adjusted under 35 U.S.C. 154(b) by 983 days.

(21) Appl. No.: 16/927,315

(22) Filed: Jul. 13, 2020

(65) Prior Publication Data
US 2021/0008677 A1    Jan. 14, 2021

(30) Foreign Application Priority Data
Jul. 12, 2019   (DE) ...................... 20 2019 103 844.6

(51) Int. Cl.
*H01F 7/04*  (2006.01)
*B23Q 3/06*  (2006.01)
*B23Q 3/154*  (2006.01)

(52) U.S. Cl.
CPC ........... *B23Q 3/1546* (2013.01); *B23Q 3/066* (2013.01)

(58) Field of Classification Search
CPC ..... B23Q 3/066; B23Q 3/1546; H01F 7/0252; H01F 7/04; B25H 1/0071; B25H 1/0021
USPC ...................................................... 335/215
See application file for complete search history.

(56) References Cited

U.S. PATENT DOCUMENTS

| | | | | |
|---|---|---|---|---|
| 2,209,558 A | * | 7/1940 | Bing | B23Q 3/1546 279/128 |
| 3,017,545 A | | 1/1962 | Meier | |
| 4,055,824 A | * | 10/1977 | Baermann | B23Q 3/152 335/295 |
| 4,314,219 A | * | 2/1982 | Haraguchi | H01F 7/04 335/295 |
| RE33,145 E | * | 1/1990 | Palm | B25H 1/0071 408/710 |
| 5,040,299 A | * | 8/1991 | Hwang | B25H 1/0078 266/70 |
| 5,275,514 A | * | 1/1994 | Johnson | B25H 1/0071 408/710 |

(Continued)

FOREIGN PATENT DOCUMENTS

| | | | | |
|---|---|---|---|---|
| DE | 000B0004127MAZ | | 10/1951 | |
| DE | 2517364 A1 | | 10/1976 | |
| GB | 2451566 A | * | 2/2009 | ............ B23B 45/02 |

*Primary Examiner* — Shawki S Ismail
*Assistant Examiner* — Lisa N Homza
(74) *Attorney, Agent, or Firm* — Muncy, Geissler, Olds & Lowe, P.C.

(57) ABSTRACT

A magnetic base for an electric power tool, in particular for a magnetic core drilling machine. The magnetic base having a base body that has a contact surface for contacting a workpiece to be machined, at least one first permanent magnet and at least one second permanent magnet arranged in the base body, the at least one and second permanent magnet having magnetic forces that interact to form a resulting holding force. The at least one first permanent magnet and the at least one second permanent magnet are supported in the base body and rotatable around its own rotation axis between a first position, in which the resulting holding force of the magnetic base is maximized, and a second position, in which the resulting holding force of the magnetic base is minimized.

17 Claims, 10 Drawing Sheets

(56) References Cited

U.S. PATENT DOCUMENTS

| | | | | |
|---|---|---|---|---|
| 6,102,633 | A * | 8/2000 | Uehlein-Proctor | B23Q 5/34 408/136 |
| 6,331,810 | B1 * | 12/2001 | Jung | B66C 1/04 335/295 |
| 7,398,834 | B2 * | 7/2008 | Jung | B25D 16/006 173/4 |
| 8,350,663 | B1 * | 1/2013 | Michael | B23Q 3/1546 338/288 |
| 8,568,066 | B2 * | 10/2013 | Beichter | B25H 1/0071 408/9 |
| 9,242,367 | B2 * | 1/2016 | Timmons | B23Q 3/1546 |
| 9,669,520 | B2 * | 6/2017 | Harris | B25B 11/002 |
| 9,764,438 | B2 * | 9/2017 | Reichert | B25H 1/0071 |
| 11,253,974 | B2 * | 2/2022 | Coleman | B25B 1/02 |
| 2006/0185866 | A1 * | 8/2006 | Jung | B25D 16/006 173/48 |
| 2012/0013060 | A1 * | 1/2012 | Chiang | B25B 11/002 269/8 |
| 2012/0174368 | A1 * | 7/2012 | Michael | H01F 7/04 29/407.01 |
| 2014/0283354 | A1 * | 9/2014 | Harris | B23K 37/0408 29/428 |
| 2014/0314507 | A1 * | 10/2014 | Timmons | B23Q 3/1546 408/76 |
| 2015/0251284 | A1 * | 9/2015 | Reichert | B25H 1/0071 408/76 |
| 2016/0001439 | A1 * | 1/2016 | Timmons | B25H 1/0071 408/76 |
| 2016/0001440 | A1 * | 1/2016 | Timmons | B23Q 3/1546 248/678 |
| 2017/0232605 | A1 * | 8/2017 | Morton | B25H 1/0071 173/37 |
| 2019/0358778 | A1 * | 11/2019 | Coleman | B25H 1/0071 |
| 2020/0361073 | A1 * | 11/2020 | Scherrenbacher | B25H 1/0071 |
| 2021/0008677 | A1 * | 1/2021 | Seebauer | B23Q 3/066 |

* cited by examiner

MAGNETIC BASE

This nonprovisional application claims priority under 35 U.S.C. § 119(a) to German Patent Application No. 20 2019 103 844.6, which was filed in Germany on Jul. 12, 2019, and which is herein incorporated by reference.

BACKGROUND OF THE INVENTION

Field of the Invention

The present invention relates to a magnetic base for an electric power tool, in particular for a magnetic core drilling machine, comprising a base body, which has a contact surface for contacting a workpiece to be machined and in which at least one first permanent magnet and at least one second permanent magnet are accommodated, whose magnetic forces interact to form a resulting holding force. The invention also relates to an electric power tool and other holder.

Description of the Background Art

Magnetic bases have already long been known from the prior art and are frequently used as part of a drill stand to fasten drilling machines, in particular core drilling machines, to the workpiece to be machined, with the aid of magnetic force. Electromagnets are customarily used for this purpose, which are also supplied with electrical power via the voltage supply of the electric power tool coupled therewith, which has proven to be highly successful in the past. However, the disadvantage arises that the magnetic holding force of these electromagnets decreases abruptly in the case of a power interruption. This ultimately results in the risk that the electric power tool secured beforehand by the electromagnet may become detached from the workpiece, which is associated with a not inconsiderable risk of injury to the user of the electric power tool. This problem occurs, in particular, if the electric power tool was fastened to the workpiece overhead with the aid of the magnetic base. In this case, it is then necessary to additionally secure the electric power tool to the workpiece with a securing device, such as a belt or the like.

These magnetic bases are also used with other holder. The magnetic bases mentioned at the outset are thus used, among other things, with vices, lifting gear and welding angles.

However, since there is an increasing desire among customers to use electric power tools cordlessly, even comparatively large electric power tools, such as magnetic core drilling machines, are supplied with electrical power from batteries these days. However, the limited capacity of these batteries makes it necessary to dispense with electromagnets and to use switchable permanent magnets instead. Otherwise, therefore if the magnetic base would also have to be supplied with electrical energy from the battery in order to generate the holding force, this would have a negative effect on the service life of the electric power tool. To be able to vary the resulting magnetic holding force, in the case of these magnetic bases, the orientation of the permanent magnets situated in the magnetic base, and thus their magnetic field lines, are mechanically changed by rotating one or multiple of the permanent magnets with respect to the one or more other permanent magnets. The resulting holding force of the magnetic base may then be changed thereby, and the magnetic base may be switched on or off.

A magnetic base of the type mentioned at the outset is known from US 2016/0001440 A1. In this case, however, the adjustment of the second permanent magnets relative to the first permanent magnets has proven to be disadvantageous, since a comparatively more complex transmission structure is needed for this purpose. The magnetic base known from the prior art is also very tall, which is disadvantageous, in particular in confined spaces.

In particular when using magnetic core drilling machines in confined spaces, such as an I-section member, which is also referred to as a double T-section member, it has also proven to be disadvantageous that the adjustment of the second permanent magnets, which, in order to switch the magnetic base on and off, must usually be rotated 180° and thereby reverse the polarity thereof, may take place only with difficulty using the adjuster, since the space requirements here are so limited that the user may grip and rotate the adjuster only with difficulty. It has further proven to be disadvantageous that the magnetic bases may be used only starting at a certain material thickness, since the resulting holding force is otherwise too low to securely fasten the magnetic base, and thus the electric power tool, to the workpiece.

SUMMARY OF THE INVENTION

It is therefore an object of the present invention to provide a magnetic base, which reduces the aforementioned disadvantages and, in particular, makes it easier to actuate the magnetic base even in spatially difficult to access environments.

The object of the invention is also to provide an improved electric power tool, which is easy to operate, in particular in confined spaces, or to provide an improved combination of a magnetic base with a holding mechanism.

The object relating to the magnetic base is achieved according to the invention in a magnetic base such that the at least one first permanent magnet and at least one second permanent magnet are each supported in a base body, rotatable around their own rotation axis between a first position, in which the resulting holding force of the magnetic base is maximized, and a second position, in which the resulting holding force of the magnetic base is minimized.

A very compact design of the magnetic base is achieved in that all permanent magnets present in the magnetic base are ultimately rotated. This also makes it possible to achieve the fact that the resulting holding force is so high, even in workpieces having only a very limited material thickness, that it is possible to fasten the magnetic base according to the invention thereto. Since all permanent magnets contributing to the resulting holding force are ultimately rotated, the need to rotate the permanent magnets only 90° between the first position and the second position is sufficient in each case, which ultimately has a positive effect on the handling of the magnetic base in confined spaces.

It has also proven to be particularly successful if the first permanent magnets and the second permanent magnets are arranged in alternating sequence. A particularly simple design of the magnetic base may be implemented hereby, and the resulting magnetic force may be particularly easily set.

This is made even more positively favored if the poles of adjacent permanent magnets of the same polarity face each other in the first position. In that the poles of adjacent permanent magnets having the same polarity face each other in the first position, these adjacent permanent magnets repel each other, whereby their magnetic field lines are deflected into the workpiece on which the magnetic base is placed. A corresponding demagnetizing field is then generated, and the resulting holding force is maximized. The magnetic base may thus be secured on the workpiece.

The poles of adjacent permanent magnets, which face the contact surface, can have different polarities. The adjacent permanent magnets attract each other hereby, and the resulting holding force of the magnetic base is minimized. The magnetic base may then be removed from the workpiece.

The rotation axes of the first permanent magnets and the rotation axes of the second permanent magnets can be arranged in a plane. A joint adjustment of the permanent magnets may be particularly easily ensured hereby. In addition, if the plane is essentially in parallel to the contact surface, it may also be further achieved that the permanent magnets all have the same distance from the workpiece, whereby the holding force is particularly uniform. Within the scope of the invention, however, it is also provided that the magnetic base may be used on convex workpieces, for example tubes. In this connection, in particular, it has then proven to be favorable if the rotation axes of the first permanent magnets and the second permanent magnets have a constant distance from the contact surface. In particular, the contact surface may also be adapted to the contour of the workpiece and be designed, for example, in a concave manner.

If the number of first permanent magnets and the number of second permanent magnets are the same, a particularly easy adjustment between the minimum and the maximum resulting holding forces may take place.

To be able to adjust the magnetic base between the first position and the second position, it has also proven to be favorable if an adjuster is provided to simultaneously rotate the first permanent magnets and the second permanent magnets around the particular rotation axis between the first position and the second position.

The adjuster can be adjustable between a first end position, in which the first permanent magnets and the second permanent magnets are in the first position, and a second end position, in which the first permanent magnets and the second permanent magnets are in the second position. In particular, if the two end positions are limited by stops, this ensures that the adjustment of the first and second permanent magnets beyond the first and second positions is not possible, which thus has a positive effect on the user-friendliness of the magnetic base.

It has also proven to be successful if a coupling mechanism is provided to transmit the adjustment of the adjuster to the rotation axes of the first permanent magnets and the second permanent magnets. The adjustment of the adjuster may be particularly easily transmitted by the coupling mechanism to the first and second permanent magnets, and the latter thus rotate around the particular rotation axes between the first position and the second position.

The coupling mechanism can have a toothed engagement between a pinion and at least one toothed rod. This makes it possible to particularly effectively implement a transmission of force and movement. In this connection, it has then also proven to be successful if the toothed rod is supported on the base body, displaceable by the adjuster. If the adjuster is moved by the user, the toothed rod in toothed engagement with the pinions assigned to the permanent magnets is displaced and rotates the permanent magnets around their particular rotation axes.

The coupling mechanism can include a coupling linkage. A simple method is also formed hereby, with the aid of which the user is able to simply grip the adjuster and adjust it between the end positions and therefore to simultaneously rotate the permanent magnets between the first position and the second position.

A total number of first and second permanent magnets can be between 2 and 10 and is, in particular, 4. The larger the total number of permanent magnets used, the smaller can the individual permanent magnets be designed, whereby thinner magnetic bases may be implemented. At the same time, however, the mechanical complexity is increased hereby, so that 4 permanent magnets have proven to be particularly advantageous.

In addition, a further object relating to the electric power tool is achieved by a combination of a magnetic base and an electric power tool. The object relating to the holder can be achieved according to the invention by a combination of a magnetic base and a holder, which can include vices, lifting gear, or welding angles, for example.

If the holder is formed from a welding angle, it has proven to be particularly favorable if two magnetic bases are assigned to the holder designed as a welding angle and are connected to each other in an articulated manner, the angle being settable between the magnetic bases. The welding angle may be particularly easily adapted hereby to the part to be joined by the welding operation. It has also proven to be particularly successful of the angle is fixable.

If the holder is designed as a vice, it has also proven to be successful if, in the case of the holder designed as a vice, the magnetic base is provided for fastening the vice on the workpiece. As a result, the vice may be fastened in any position on a magnetic substrate. Within the scope of the invention, one or both of the clamping jaws of the vice may contain a magnetic base according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
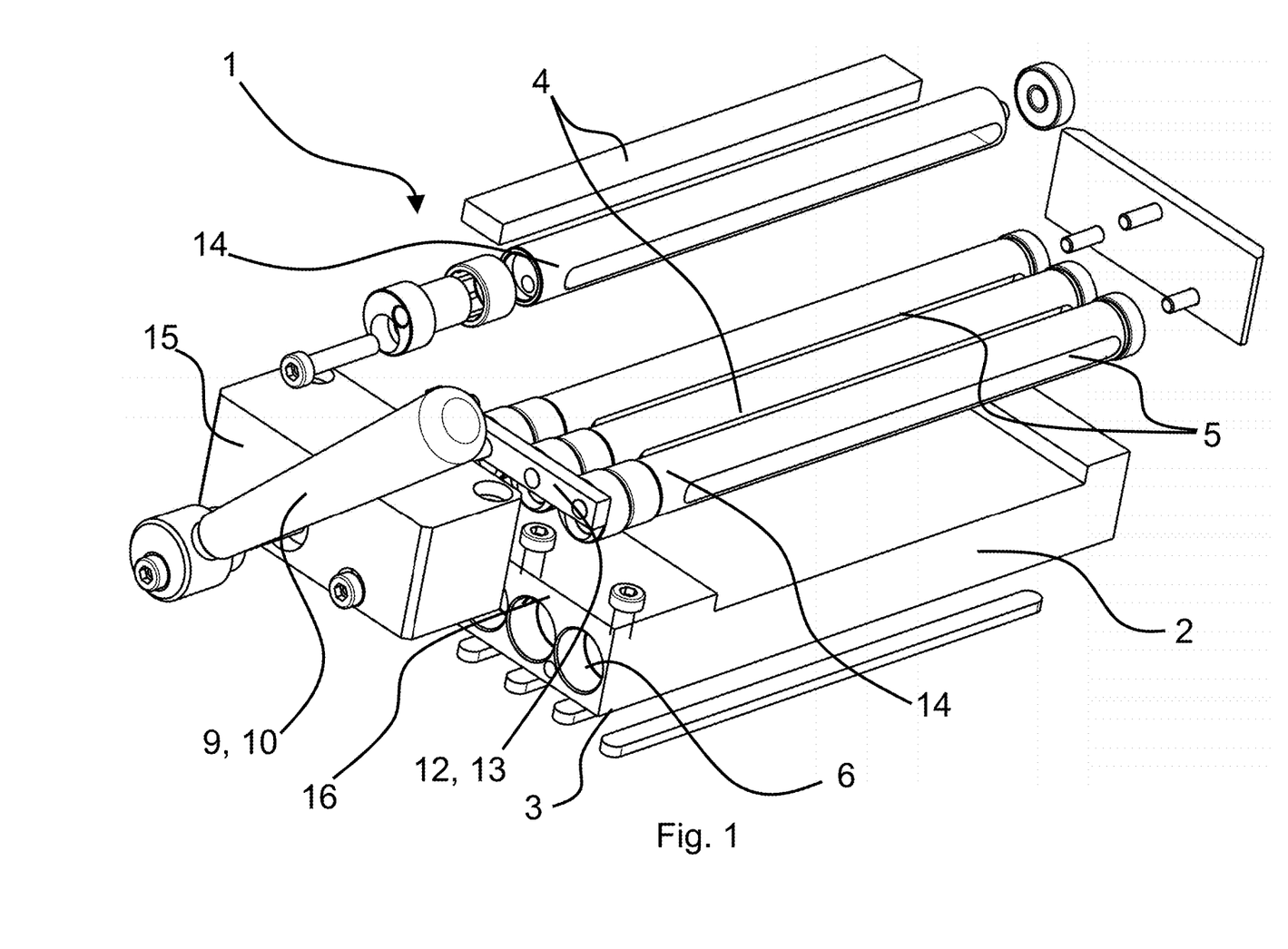
FIG. 1 shows an exploded view of a magnetic base.

FIG. 1 shows a exploded view of a magnetic base 1 for a magnetic core drilling machine. Magnetic base 1 comprises a base body 2, which has a contact surface 3 for contacting a workpiece 8 to be machined. Multiple first permanent magnets 4 and second permanent magnets 5 are arranged in base body 2, whose magnetic forces interact to form a resulting holding force. First permanent magnets 4 and second permanent magnets 5, which are ultimately differentiated only with respect to their pole arrangement, are arranged in alternating sequence in receptacles 6, which are formed in base body 2. First permanent magnets 4 and second permanent magnets 5 are supported in these receptacles 6, each rotatable around its own rotation axis 7, between a first position, in which the resulting holding force of magnetic base 1 is maximized, and a second position, in which the resulting holding force of magnetic base 1 is minimized.

In the first position, the poles of adjacent permanent magnets 4, 5 facing each other have the same polarity with respect to each other. This results in a repelling of permanent magnets 4, 5, whereby the field lines exit magnetic base 1 and generate a demagnetizing field in workpiece 8, whereby the resulting holding force is maximized, as will be explained in greater detail below with reference to FIGS. 5 through 8. In the second position of permanent magnets 4, 5, the poles of adjacent permanent magnets 4, 5 facing contact surface 3 have different polarities. Permanent magnets 4, 5 attract each other hereby, and the field lines of permanent magnets 4, 5 ultimately remain in magnetic base 1. The resulting holding force is therefore minimized, and magnetic base 1 may be removed from workpiece 8.

In addition, an adjuster 9, which is designed as a handle 10, is provided for adjusting first permanent magnets 4 and second permanent magnets 5. It may also be gripped by the user and is adjustable between a first end position, in which first permanent magnets 4 and second permanent magnets 5 are in the first position, and a second end position, in which first permanent magnets 4 and second permanent magnets 5 are in the second position. With the aid of this handle 10, permanent magnets 4, 5 arranged in magnetic base 1 are simultaneously rotatable around particular rotation axis 7 between the first position and the second position to thereby change the resulting holding force of magnetic base 1. As is apparent in FIG. 1 and, in particular, also in FIGS. 5 through 8, rotation axes 7 of first permanent magnets 4 and second permanent magnets 5 are arranged in a plane 11, which is in parallel to contact surface 3. In the illustrated exemplary embodiment, a total of 2 first permanent magnets 4 and 2 second permanent magnets 5 are provided, whose magnetic forces complement each other to form a resulting holding force.

A coupling mechanism 12, which in the illustrated exemplary embodiment includes a coupling linkage 13, is provided to transmit the adjustment of adjuster 9 onto rotation axes 7 of first permanent magnets 4 and second permanent magnets 5. Thus, if the user transfers adjuster 9 out of the second end position into the first end position, first permanent magnets 4 and second permanent magnets 5 are also simultaneously transferred out of the second position into the first position by coupling linkage 13, and are thus rotated around rotation axes 7.

Figure 2:
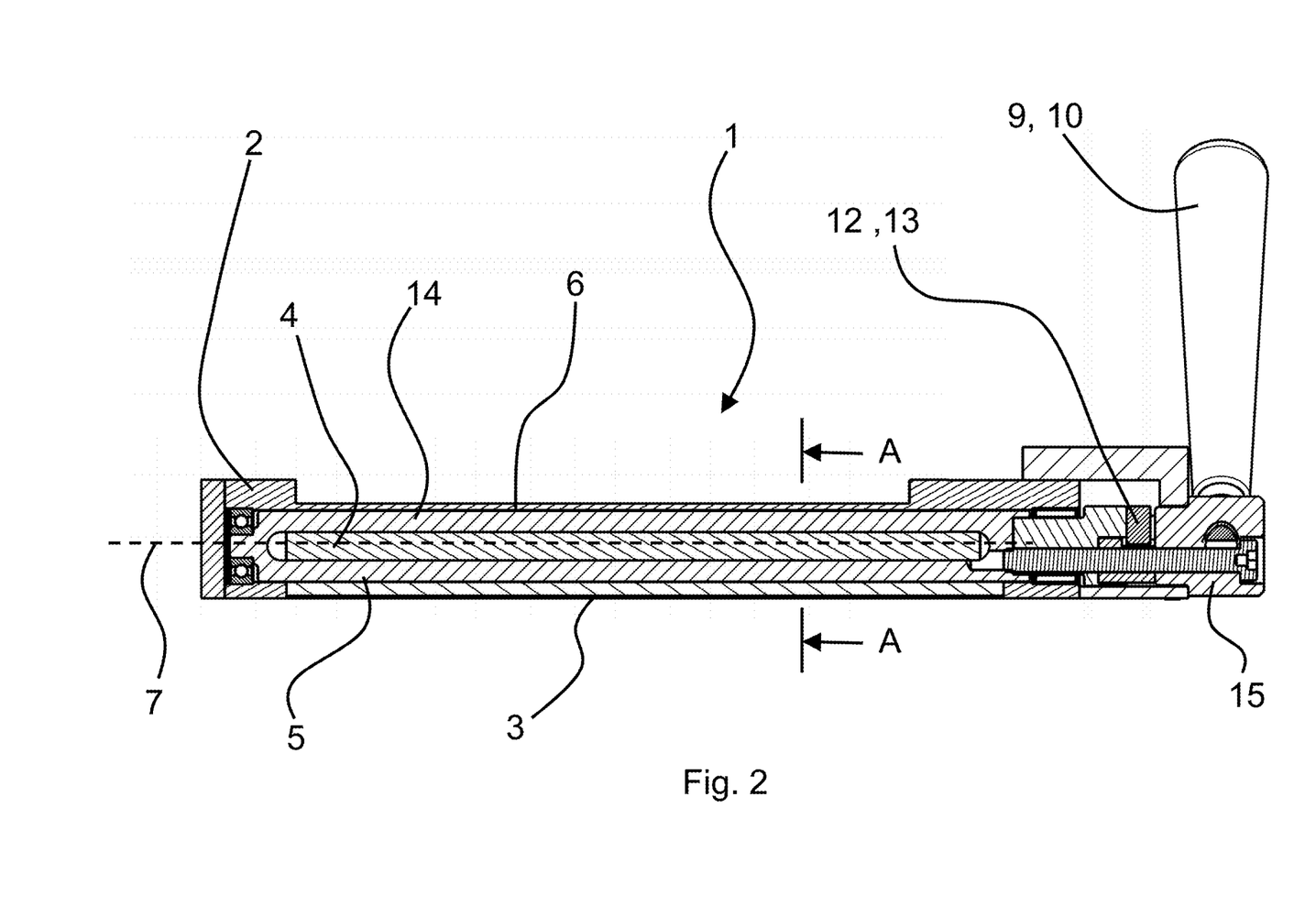
FIG. 2 shows a longitudinal sectional view of the magnetic base.

FIG. 2 shows a view along a longitudinal section of magnetic base 1. In particular, the arrangement of permanent magnets 4, 5 in base body 2 is apparent herefrom. These permanent magnets have a rectangular cross section and are accommodated in a cylindrical casing 14, which is rotatably fastened in receptacle 6 of base body 2. A cover 15, in which coupling mechanism 12 is accommodated, is fastened on an end face 16 of magnetic base 1, which faces adjuster 9.

Figure 3:
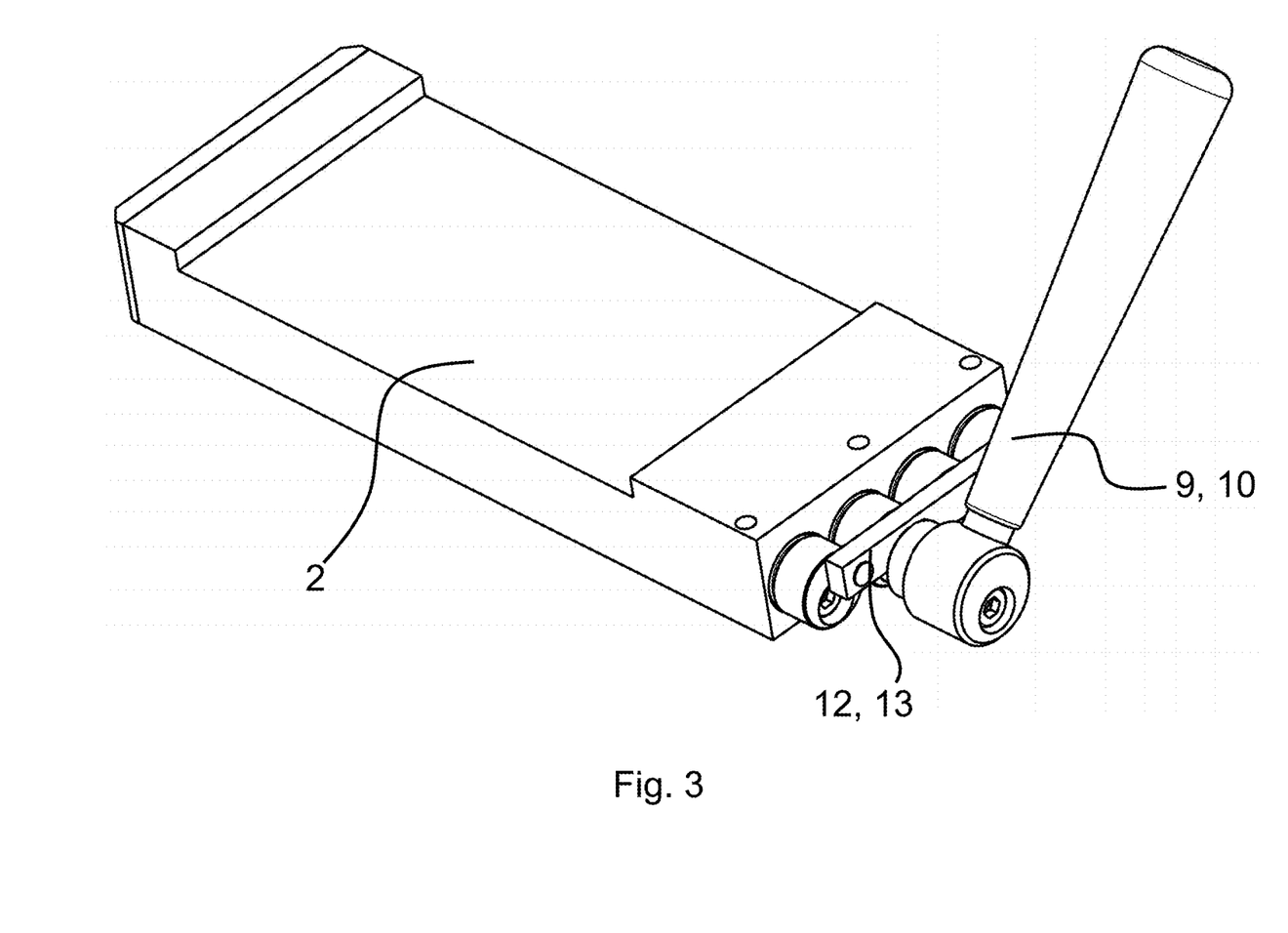
FIG. 3 shows a perspective detailed view of a first coupling mechanism of a magnetic base.

FIG. 3 shows a detailed view of coupling mechanism 12 of magnetic base 1, which is shown without a cover, the coupling mechanism including coupling linkage 13. The latter is fastened eccentrically to particular rotation axes 7 on the end faces of permanent magnets 4, 5 or their casing 14, so that an adjustment of adjuster 9 results in a rotation of permanent magnets 4, 5 connected to coupling linkage 13 around particular rotation axes 7.

Figure 4:
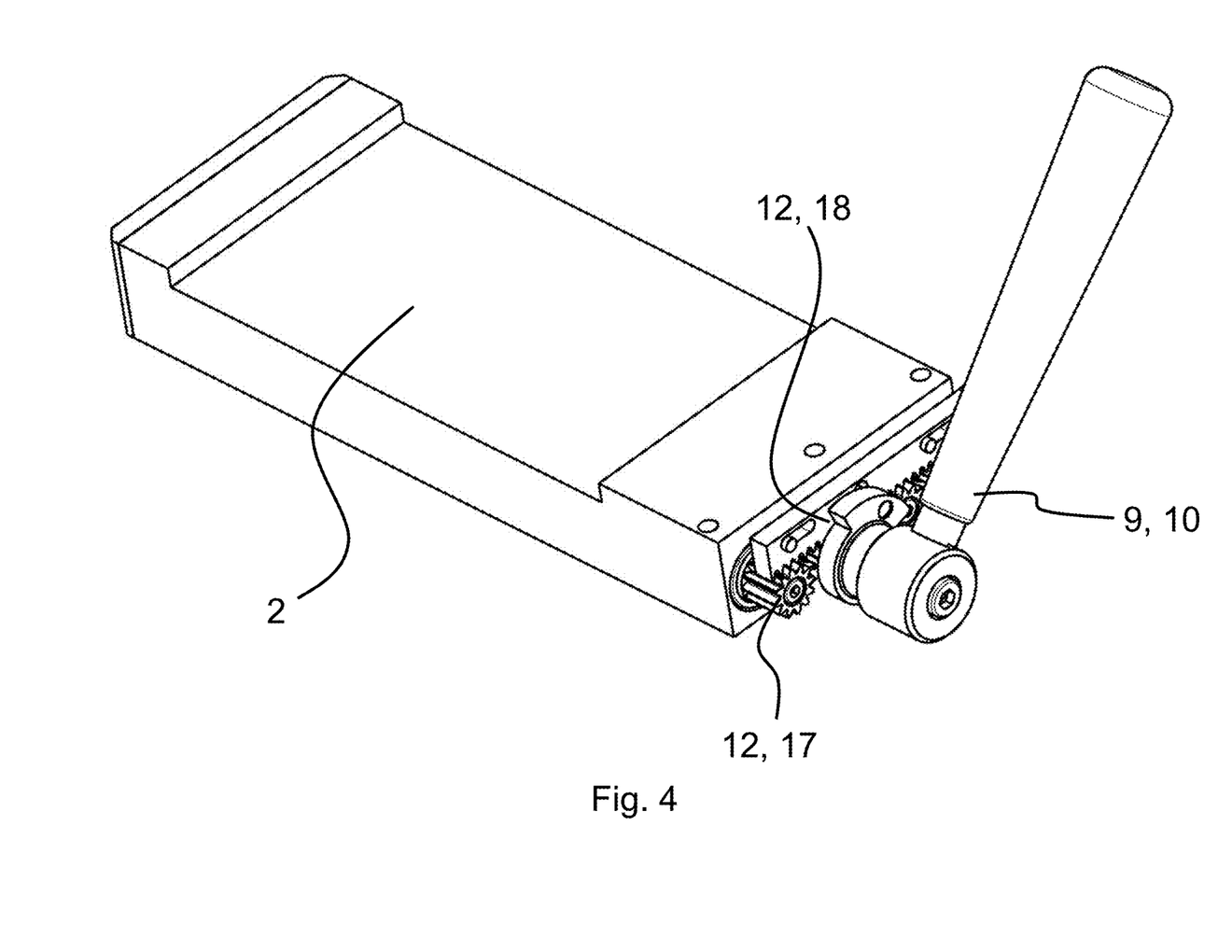
FIG. 4 shows a perspective detailed view of a second coupling mechanism of a magnetic base.

In the specific embodiment of magnetic base 1 illustrated in FIG. 4, pinions 17, which are in toothed engagement with a toothed rod 18, are connected to permanent magnets 4, 5 or their casing 14. This toothed rod 18 is connected to adjuster 9 and is displaceably supported in base body 2. Therefore, if the user adjusts adjuster 9, toothed rod 18 is displaced and thus rotates pinions 17, which are in toothed engagement.

Figure 5:
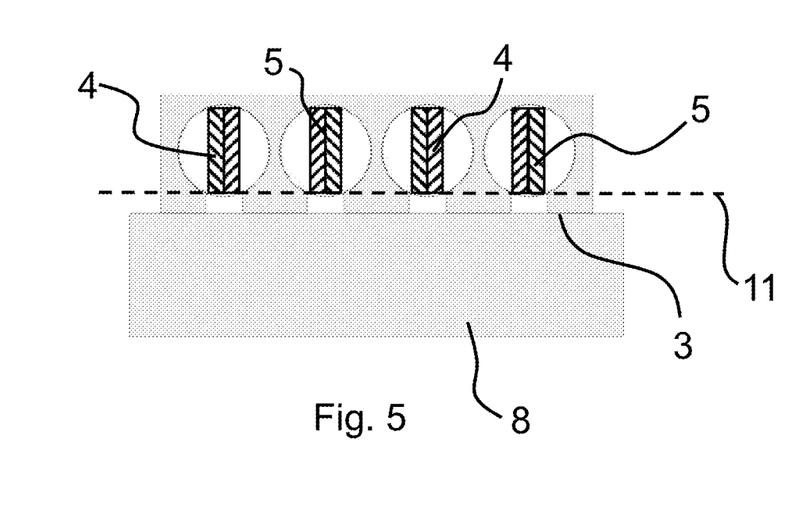
FIG. 5 shows a sectional view along section A-A from FIG. 2 with a maximum resulting holding force.
Figure 6:
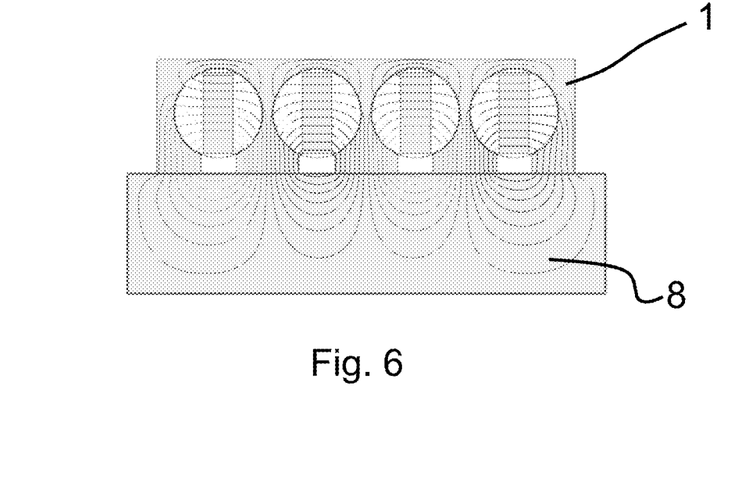
FIG. 6 shows the magnetic field lines of the permanent magnets from FIG. 6.
Figure 7:
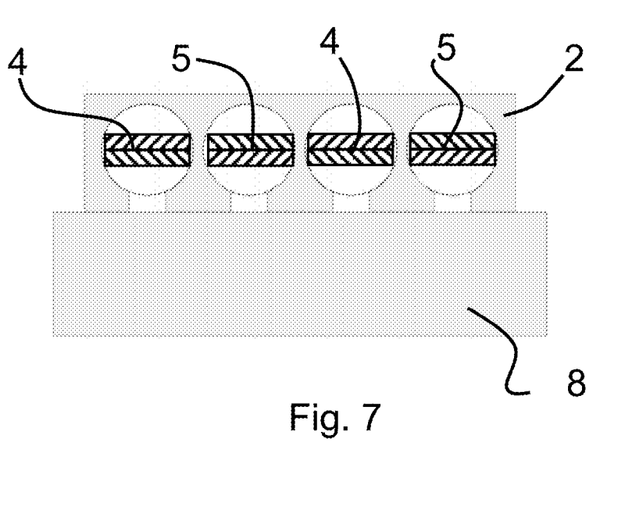
FIG. 7 shows a sectional view along section A-A from FIG. 2 with a minimum resulting holding force.
Figure 8:
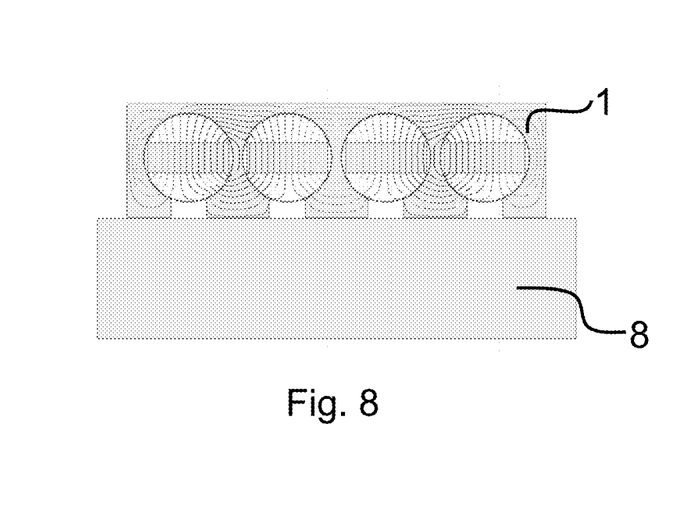
FIG. 8 shows the magnetic field lines of the permanent magnets from FIG. 8.

FIGS. 5 through 8 each show permanent magnets 4, 5 of magnetic base 1 in a cross-sectional view along section A-A from FIG. 2. FIGS. 5 and 6 show permanent magnets 4, 5 in the first position, in which the resulting holding force of permanent magnets 4, 5 is maximized. FIGS. 7 and 8 show permanent magnets 4, 5 in the second position, in which the resulting holding force is minimized. In FIGS. 5 and 7, poles of the same polarity have the same cross-hatching.

In the first position of permanent magnets 4, 5 illustrated in FIGS. 5 and 6, the latter are arranged in such a way that the facing poles of adjacent permanent magnets 4, 5 have the same polarity and thus repel each other, as is apparent, in particular, from the magnetic field lines illustrated in FIG. 6. A demagnetizing field is induced hereby in workpiece 8. The repelling of adjacent permanent magnets 4, 5 thus ultimately leads to the fact that the resulting holding force of magnetic base 1 is maximized.

In the second position of permanent magnets 4, 5, which is illustrated in FIGS. 7 and 8, permanent magnets 4, 5 are oriented with respect to each other in such a way that adjacent permanent magnets 4, 5 attract each other, whereby the magnetic field lines essentially run exclusively within permanent magnets 4, 5. The resulting holding force of magnetic base 1 is minimized thereby.

Figure 9:
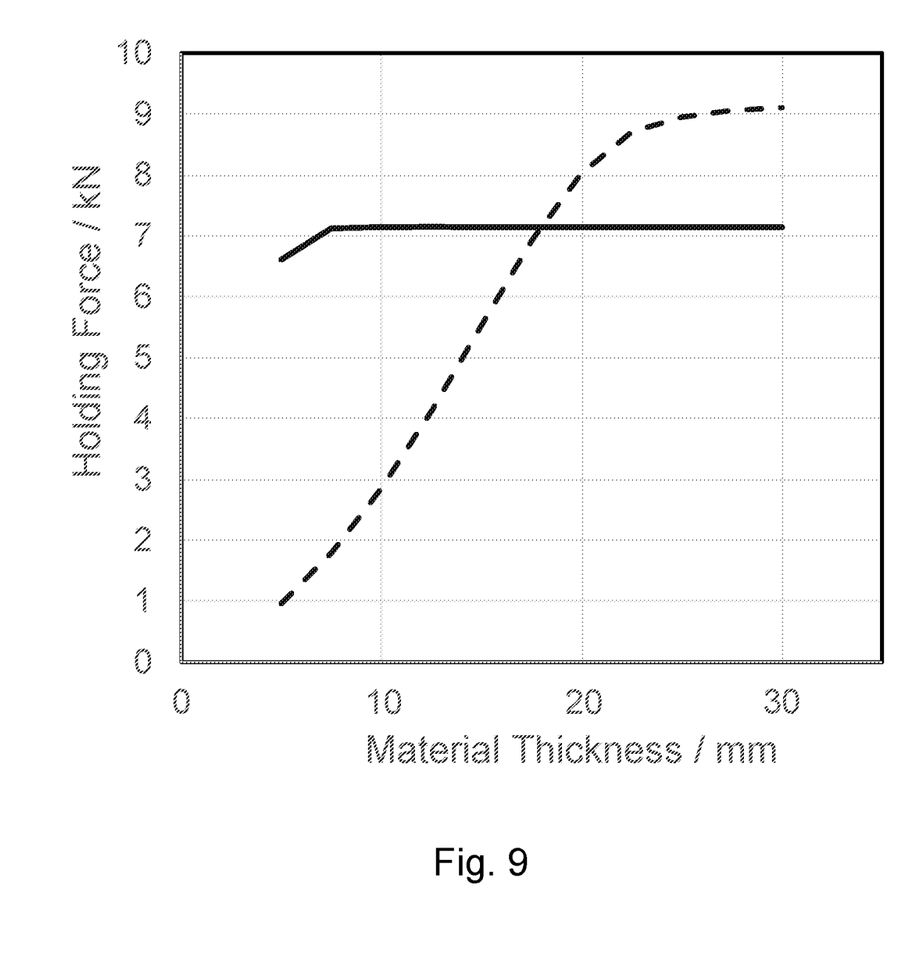
FIG. 9 shows a diagram of the holding force as a function of the plate thickness.

The diagram illustrated in FIG. 9 shows the resulting holding force of magnetic base 1 as a function of the material thickness of workpiece 8, on which magnetic base 1 is placed. A total of two curves are apparent. The solid curve shows the progression of the holding force of magnetic base 1 according to the invention, and the dashed curve show the holding force progression of magnetic bases 1 known from the prior art, in which only two permanent magnets 4, 5 are usually provided, which are arranged in a plane 11 oriented perpendicularly to workpiece 8 and of which only one is rotated with respect to the other stationary one. While the resulting holding force increases in conventional magnetic base 1 along with the increasing material thickness of workpiece 8, in magnetic base 1 according to the invention, the resulting holding force is constant, starting with a very limited material thickness, although at a lower value than in the case of a magnetic base 1 known from the prior art.

Figure 10:
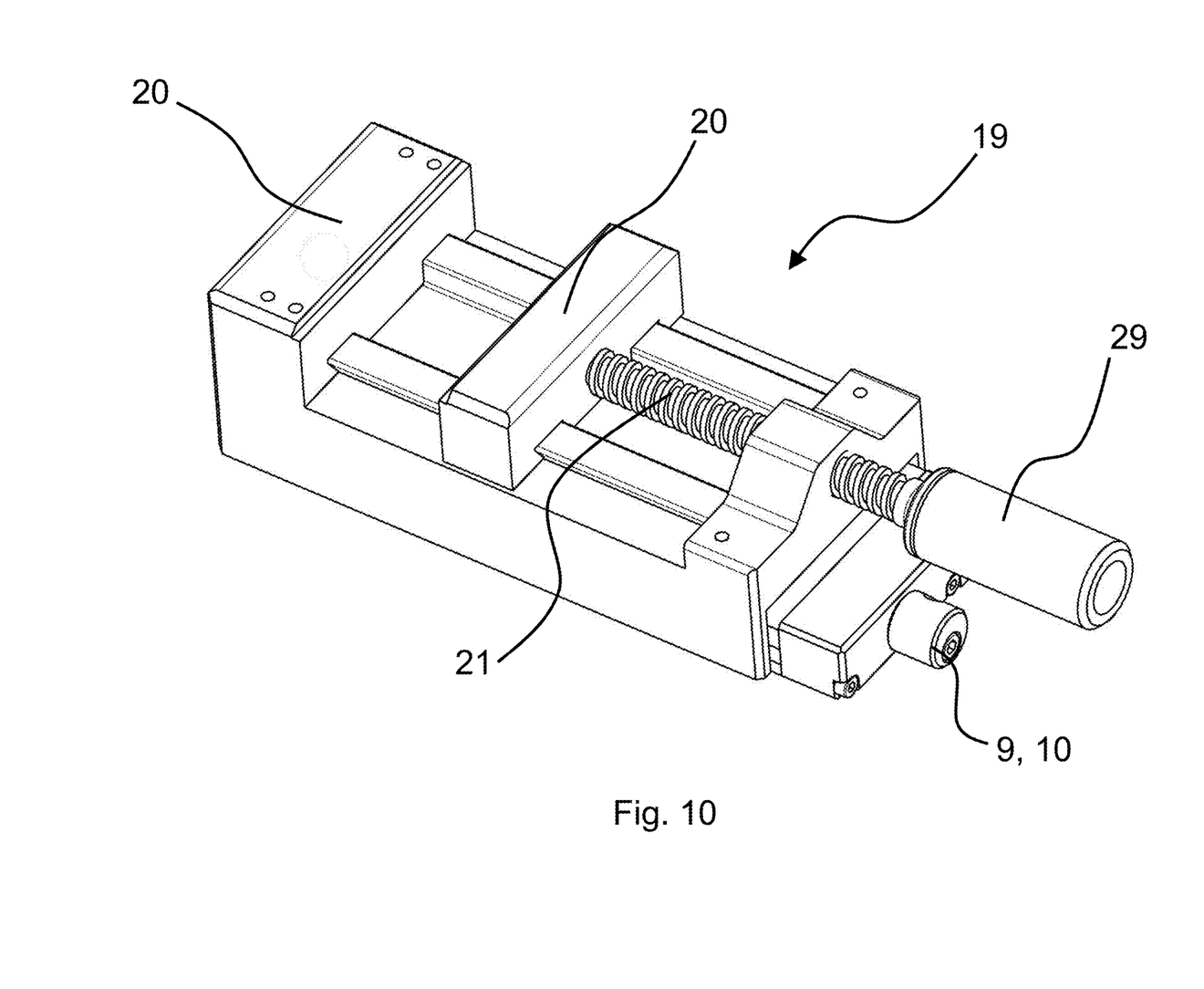
FIG. 10 shows a perspective view of a vice, including a magnetic base.

FIG. 10 shows a perspective view of a vice 19, which may be fastened on a magnetic surface by a magnetic base 1. For this purpose, the user must only position vice 19 on the surface and transfer handle 10 used as adjuster 9 out of the second end position into the first end position. The user may then fix the workpiece situated between clamping jaws 20 of vice 19 by adjusting clamping jaws 20 with the aid of a spindle drive 21. In the illustrated exemplary embodiment, only one of clamping jaws 20 is adjustable by an actuater 29, while the other clamping jaw 20 is fixedly mounted on magnetic base 1.

Figure 11:
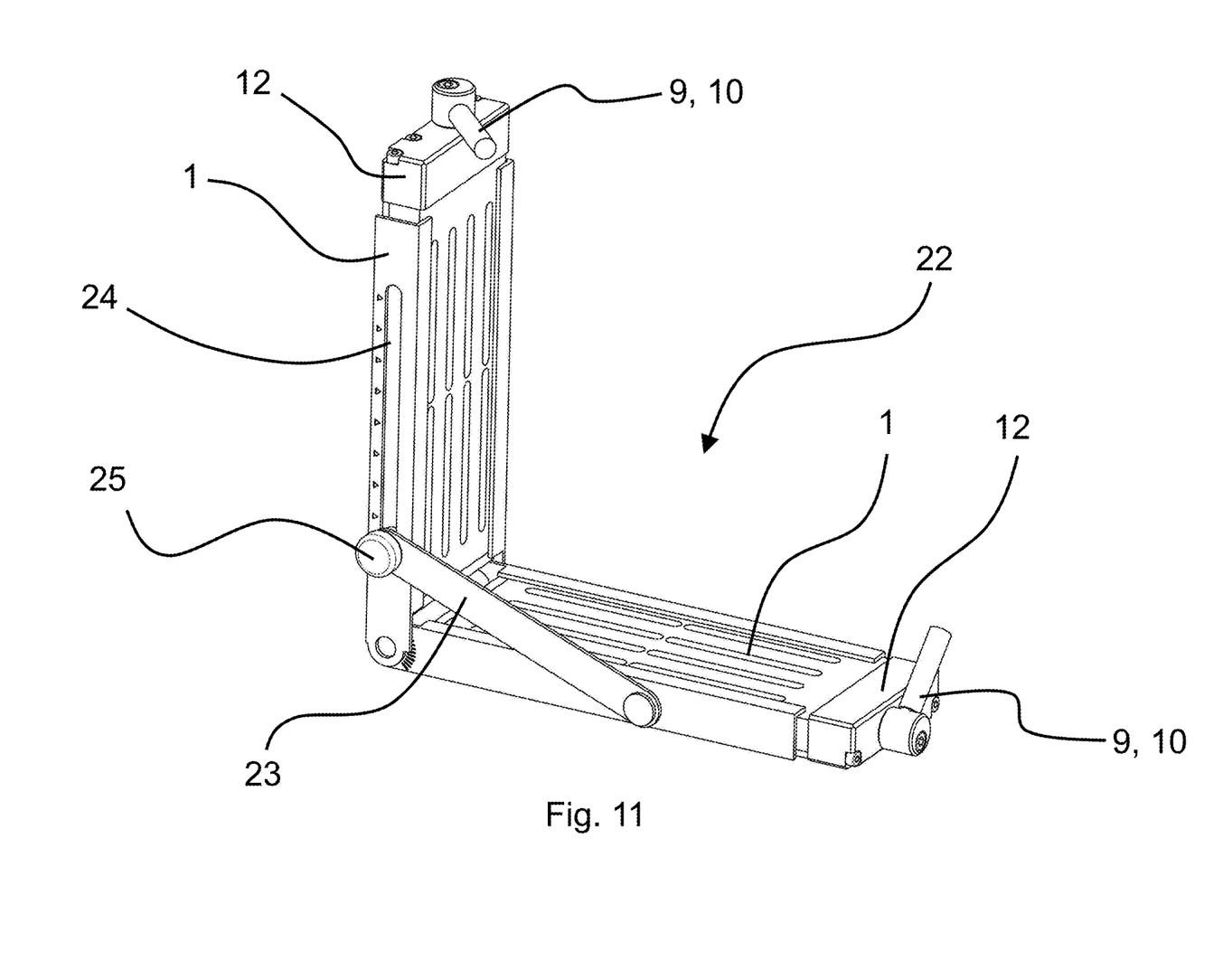
FIG. 11 shows a perspective view of a welding angle, including multiple magnetic bases.

FIG. 11 also shows a welding angle 22 in a perspective specific embodiment, in which two magnetic bases 1 are used. These magnetic bases 1 are connected to each other in an articulated manner, so as to allow the angle to be adjusted between them both. To facilitate operation, a guide arm 23 is provided, which is rotatably fastened on one of magnetic bases 1 and which is displaceably and rotatably supported in a guide rail 24 on the other magnetic base. Guide arm 23 may then be locked by a fixing screw 25 in this guide rail 24, whereby the angle may be fixed between the two magnetic bases 1. If the angle is adapted to the welding situation, the two components to be welded may each be fastened on one of magnetic bases 1 in that handle 10 used as adjuster 9 is transferred out of the second end position into the first end position in each case.

Figure 12:
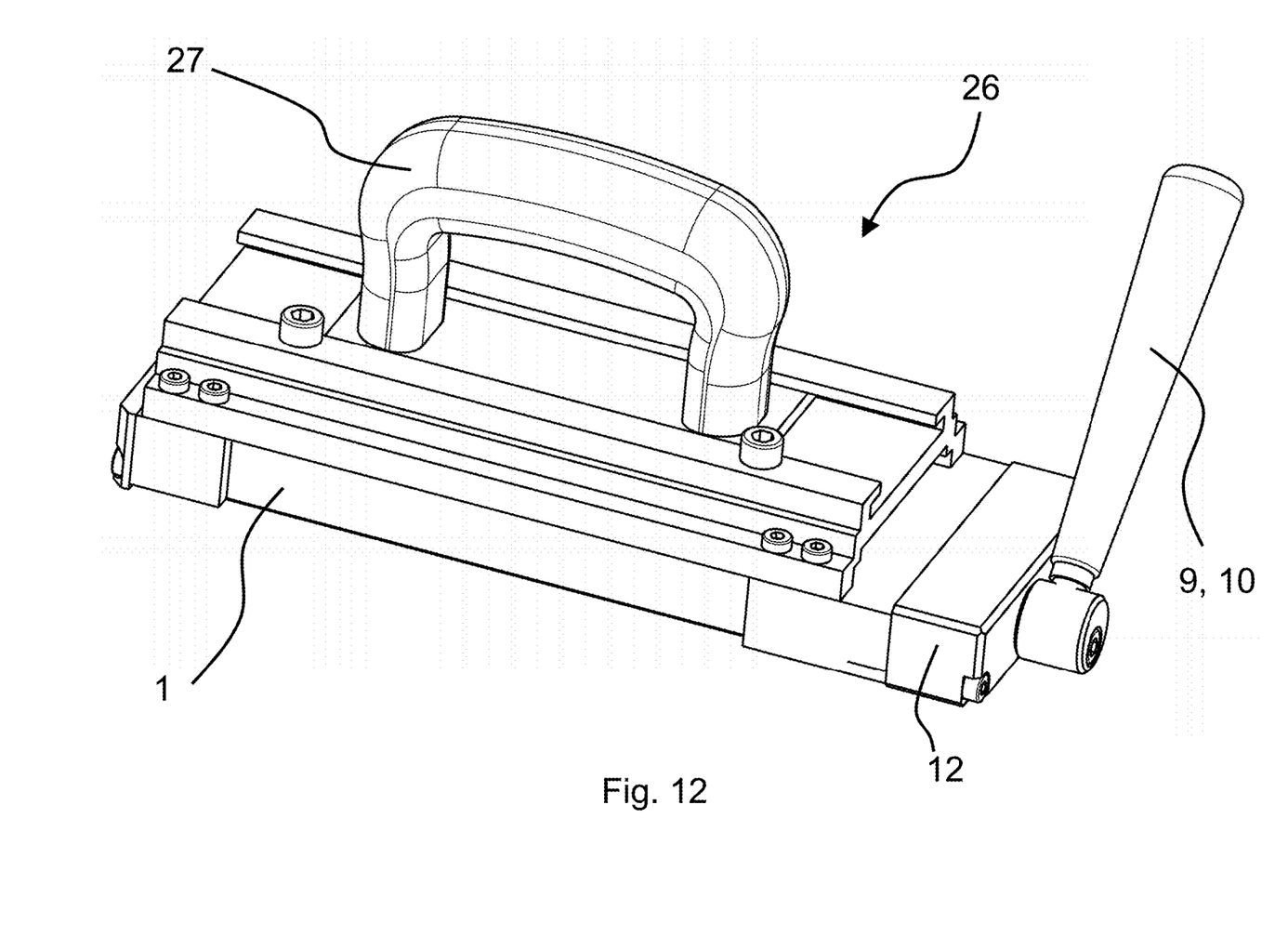
FIG. 12 shows a perspective view of a first specific embodiment of a lifting gear, including a magnetic base.
Figure 13:
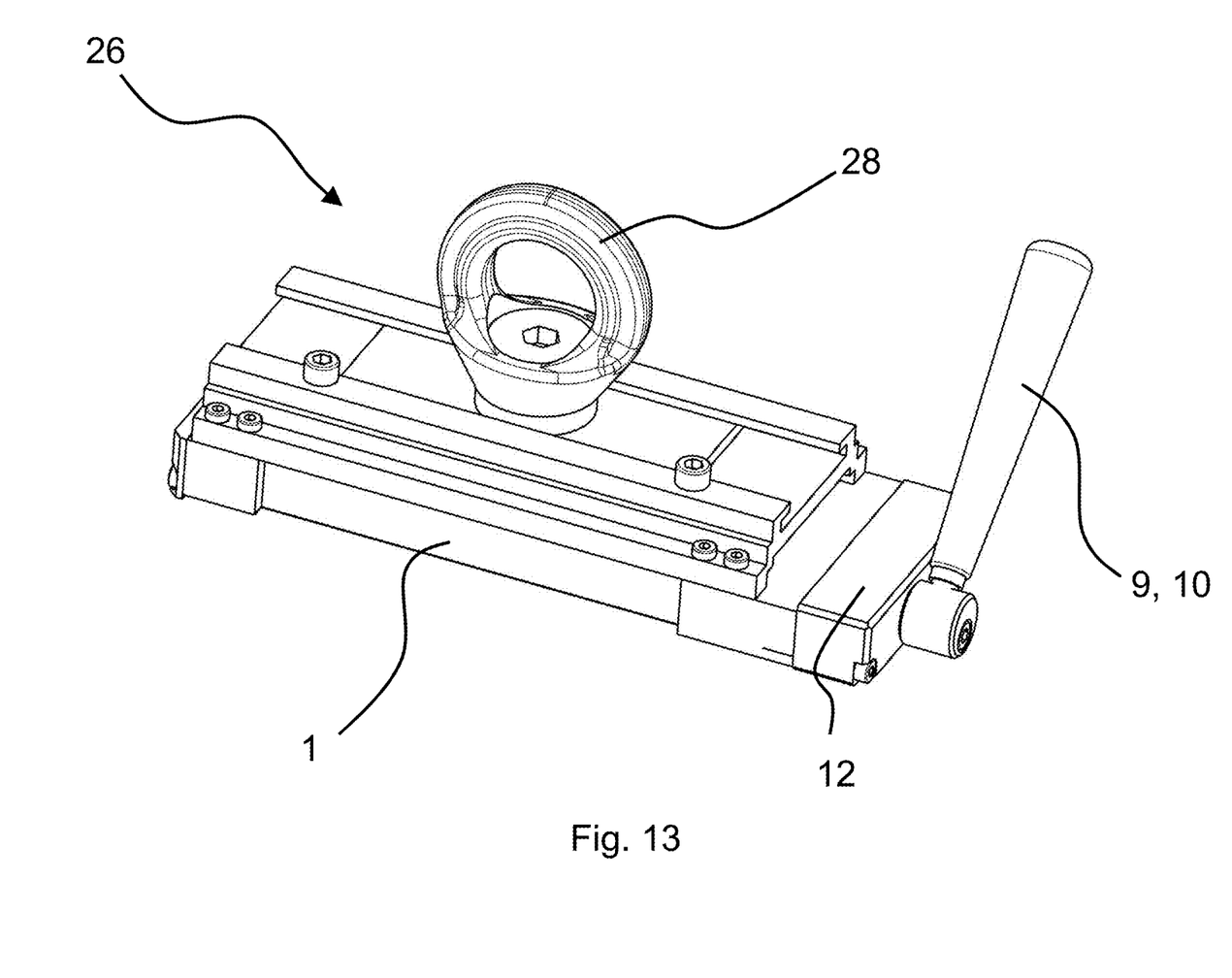
FIG. 13 shows a perspective view of a second specific embodiment of a lifting gear, including a magnetic base.

FIG. 12 also shows a first specific embodiment of a lifting gear 26, which makes it possible to lift or also to transport magnetic workpieces. For this purpose, a handle 27 is mounted on magnetic base 1, which enables the user to grip and lift lifting gear 26 coupled with the workpiece to be transported. Lifting gear 26 may also be used to orient the workpiece. To be able to also fasten lifting gear 26 on a crane or a lifting arm, a receiving eyelet 28, into which a crane hook, for example, may be suspended, is formed in a second specific embodiment, which is illustrated in FIG. 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic base for an electric power tool, the magnetic base comprising:
   a base body that has a contact surface for contacting a workpiece to be machined; and
   at least one first permanent magnet and at least one second permanent magnet arranged in the base body, the at least one first permanent magnet and the at least one second permanent magnet having magnetic forces that interact to form a resulting holding force,
   wherein the at least one first permanent magnet and the at least one second permanent magnet are supported in the base body, the at least one first permanent magnet and the at least one second permanent magnet each being rotatable around a respective rotation axis between a first position, in which the resulting holding force of the magnetic base is maximized, and a second position, in which the resulting holding force of the magnetic base is minimized, and
   wherein, in the second position, the poles of adjacent permanent magnets, that face the contact surface, have different polarities from one another.

2. The magnetic base according to claim 1, wherein the at least one first permanent and the at least one second permanent magnet are arranged in alternating sequence.

3. The magnetic base according to claim 1, wherein the poles of adjacent permanent magnets, that have the same polarity, face each other in the first position.

4. The magnetic base according to claim 1, wherein the rotation axis of the at least one first permanent magnet and the rotation axis of the at least one second permanent magnet are arranged in a plane, the plane being essentially in parallel to the contact surface.

5. The magnetic base according to claim 1, wherein the rotation axes of the at least one first permanent magnet and the at least one second permanent magnet have a constant distance from the contact surface.

6. The magnetic base according to claim 1, wherein an adjuster is provided for simultaneously rotating the at least one first permanent magnet and the at least one second permanent magnet around each respective rotation axis between the first position and the second position.

7. The magnetic base according to claim 6, wherein the adjuster is adjustable between a first end position, in which the at least one first permanent magnet and the at least one second permanent magnet are in the first position, and a second end position, in which the at least one first permanent magnet and the at least one second permanent magnet are in the second position.

8. The magnetic base according to claim 6, wherein a coupling mechanism is provided to transmit the adjustment of the adjuster to the rotation axes of the at least one first permanent magnet and the at least one second permanent magnet.

9. The magnetic base according to claim 8, wherein the coupling mechanism has a toothing engagement between a pinion and at least one toothed rod.

10. The magnetic base according to claim 9, wherein the toothed rod is supported on the base body and is displaceable by the adjuster.

11. The magnetic base according to claim 8, wherein the coupling mechanism includes a coupling linkage.

12. The magnetic base according to claim 1, wherein a total number of the at least one first permanent magnet and the at least one second permanent magnet is between 2 and 10 or is 4.

13. A combination of the magnetic base according to claim 1 and an electric power tool or a holder, the holder comprising a vice, a lifting gear, or a welding angle.

14. The combination according to claim 13, wherein two of the magnetic base are provided, the two magnetic bases being connected to each other in an articulated manner and being assigned to the holder, wherein the holder is a welding angle, the welding angle being settable between the two magnetic bases.

15. The combination according to claim 13, wherein, when the holder is a vice, the magnetic base is provided for fastening the vice on the workpiece.

16. The magnetic base according to claim 1, wherein the rotation axis of each of the at least one first permanent magnet and the at least one second permanent magnet are arranged in a same plane, the same plane extending parallel to the contact face of the base body.

17. The magnetic base according to claim 16, wherein the at least one first permanent magnet and the at least one second permanent magnet are arranged in alternating sequence along the same plane.

\* \* \* \* \*